US009290108B2

(12) United States Patent
Payne et al.

(10) Patent No.: US 9,290,108 B2
(45) Date of Patent: Mar. 22, 2016

(54) SYSTEM AND METHOD FOR ADAPTIVE BATTERY TEMPERATURE CONTROL OF A VEHICLE OVER A KNOWN ROUTE

(71) Applicant: Toyota Motor Engineering & Manufacturing North America, Inc., Erlanger, KY (US)

(72) Inventors: Joshua D. Payne, Irvine, CA (US); Mohammad E. Dufford, Los Angeles, CA (US)

(73) Assignee: Toyota Motor Engineering & Manufacturing North America, Inc., erlanger, KY (US)

( * ) Notice: Subject to any disclaimer, the term of this patent is extended or adjusted under 35 U.S.C. 154(b) by 72 days.

(21) Appl. No.: 14/231,255

(22) Filed: Mar. 31, 2014

(65) Prior Publication Data

US 2015/0274030 A1     Oct. 1, 2015

(51) Int. Cl.
    *B60L 11/18*      (2006.01)
    *G01C 21/34*      (2006.01)

(52) U.S. Cl.
    CPC ......... *B60L 11/1874* (2013.01); *B60L 11/1872* (2013.01); *G01C 21/3461* (2013.01); *Y10S 903/903* (2013.01)

(58) Field of Classification Search
    CPC ............ H01M 10/613; H01M 16/006; H01M 10/615; B60L 11/187; B60L 11/1862; B60L 2260/52; B60L 11/123; B60L 11/14; B60L 11/1816; B60L 11/1861; B60L 11/1872; B60L 11/1874; B60L 2240/64; B60K 6/445; Y02T 10/6217; Y02T 10/7283; Y02T 10/6291; B60W 10/08; B60W 10/26; B60W 10/06

USPC .............. 701/22, 103, 110, 408, 99; 903/903, 903/907; 180/65.29, 65.1; 320/150, 128, 320/137, 144, 153
See application file for complete search history.

(56) References Cited

U.S. PATENT DOCUMENTS

| 6,076,964 A | 6/2000 | Wu et al. |
| 6,118,237 A | 9/2000 | Kikuchi et al. |

(Continued)

FOREIGN PATENT DOCUMENTS

| DE | 10035027 | 7/2000 |
| DE | 10233376 | 2/2004 |

(Continued)

OTHER PUBLICATIONS

US 8,447,504, 05/2013, Konishi et al. (withdrawn)

*Primary Examiner* — Marthe Marc-Coleman
(74) *Attorney, Agent, or Firm* — Snell & Wilmer LLP

(57) ABSTRACT

A system/method for controlling a battery temperature of a vehicle over a known route. The method may include providing a route having a starting and ending location, iteratively sensing a battery temperature of the battery when the vehicle is travelling along the route, and dividing the route into a plurality of route segments. The method may also include storing a known route having a plurality of segments where each segment has a corresponding battery temperature of the vehicle when the vehicle previously travelled along the segment. The method may also include providing a cooling device associated with a battery of the vehicle, initiating the cooling device during a previous time segment when the battery temperature for a particular time segment of the known route exceeds a high temperature threshold, and reducing an amount of battery power draw from the battery during the previous time segment.

20 Claims, 5 Drawing Sheets

(56) References Cited

U.S. PATENT DOCUMENTS

| | | |
|---|---|---|
| 6,233,517 B1 | 5/2001 | Froeberg |
| 6,314,347 B1 | 11/2001 | Kuroda et al. |
| 6,688,122 B2 | 2/2004 | Matsuoka |
| 6,941,222 B2 | 9/2005 | Yano et al. |
| 7,058,506 B2 | 6/2006 | Kawase et al. |
| 7,154,068 B2 | 12/2006 | Zhu et al. |
| 7,199,559 B2 | 4/2007 | Yanagi |
| 7,221,287 B2 | 5/2007 | Gueziec et al. |
| 7,233,861 B2 | 6/2007 | Van Buer et al. |
| 7,360,615 B2 | 4/2008 | Salman et al. |
| 7,395,149 B2 | 7/2008 | Matsumoto et al. |
| 7,610,145 B2 | 10/2009 | Kantarjiev et al. |
| 7,657,373 B2 | 2/2010 | Kindo |
| 7,778,769 B2 | 8/2010 | Boss et al. |
| 7,783,396 B2 | 8/2010 | Arita et al. |
| 7,788,027 B2 | 8/2010 | Jones |
| 7,877,198 B2 | 1/2011 | Tenzer et al. |
| 7,880,597 B2 | 2/2011 | Uchida |
| 7,999,505 B2 | 8/2011 | Bertness |
| 7,999,664 B2 | 8/2011 | Barajas |
| 8,063,609 B2 | 11/2011 | Salasoo et al. |
| 8,068,977 B2 | 11/2011 | Ozawa et al. |
| 8,073,615 B2 | 12/2011 | Kudoh et al. |
| 8,165,791 B2 | 4/2012 | Yamada et al. |
| 8,175,802 B2 | 5/2012 | Forstall et al. |
| 8,204,640 B2 | 6/2012 | Tani et al. |
| 8,258,726 B2 | 9/2012 | Okuda et al. |
| 8,290,637 B2 | 10/2012 | Krupadanam et al. |
| 8,336,651 B2 | 12/2012 | Nishi et al. |
| 8,346,420 B2 | 1/2013 | Tarnowsky et al. |
| 8,370,012 B2 | 2/2013 | Yamada et al. |
| 8,392,116 B2 | 3/2013 | Lehmann et al. |
| 8,428,804 B2 | 4/2013 | Sakai et al. |
| 8,457,874 B2 | 6/2013 | Kancharla et al. |
| 8,478,642 B2 | 7/2013 | Dey et al. |
| 8,498,809 B2 | 7/2013 | Bill |
| 8,509,987 B2 | 8/2013 | Resner |
| 8,515,607 B2 | 8/2013 | Amano et al. |
| 8,532,920 B2 | 9/2013 | Coleman et al. |
| 8,548,660 B2 | 10/2013 | Thai-Tan et al. |
| 8,576,057 B2 | 11/2013 | Sekiyama et al. |
| 2004/0230376 A1 | 11/2004 | Ichikawa et al. |
| 2008/0012535 A1 | 1/2008 | Takatsuji et al. |
| 2008/0027639 A1 | 1/2008 | Tryon |
| 2008/0183348 A1* | 7/2008 | Arita et al. ............... 701/22 |
| 2008/0252484 A1 | 10/2008 | Hopkins |
| 2009/0082967 A1 | 3/2009 | Hara et al. |
| 2009/0138190 A1 | 5/2009 | Kulik et al. |
| 2009/0293522 A1 | 12/2009 | Miyazaki |
| 2010/0090818 A1 | 4/2010 | Sekiyama et al. |
| 2010/0324765 A1* | 12/2010 | Iida et al. ............... 701/22 |
| 2011/0127958 A1 | 6/2011 | Ishishita et al. |
| 2011/0161001 A1 | 6/2011 | Fink |
| 2011/0166773 A1 | 7/2011 | Raz et al. |
| 2011/0231354 A1 | 9/2011 | O'Sullivan et al. |
| 2011/0246010 A1 | 10/2011 | de la Torre Bueno |
| 2012/0032637 A1 | 2/2012 | Kotooka et al. |
| 2012/0035843 A1 | 2/2012 | Miura et al. |
| 2012/0158228 A1 | 6/2012 | Biondo et al. |
| 2012/0173245 A1 | 7/2012 | Miyahara et al. |
| 2012/0200257 A1 | 8/2012 | Schwarz et al. |
| 2012/0290149 A1 | 11/2012 | Kristinsson et al. |
| 2012/0316712 A1 | 12/2012 | Simonini et al. |
| 2013/0013183 A1 | 1/2013 | Surnilla et al. |
| 2013/0024060 A1 | 1/2013 | Sukkari et al. |
| 2013/0030694 A1 | 1/2013 | Nortrup |
| 2013/0131892 A1 | 5/2013 | Hashimoto et al. |
| 2013/0198031 A1 | 8/2013 | Mitchell et al. |
| 2013/0229153 A1 | 9/2013 | Sarkar et al. |
| 2013/0261914 A1 | 10/2013 | Ingram et al. |
| 2013/0274952 A1 | 10/2013 | Weslati et al. |
| 2014/0148970 A1* | 5/2014 | Dufford et al. ............... 701/1 |
| 2015/0105948 A1* | 4/2015 | Chang et al. ............... 701/22 |

FOREIGN PATENT DOCUMENTS

| | | |
|---|---|---|
| DE | 102005005002 | 8/2006 |
| EP | 2355018 | 8/2011 |
| GB | 2499712 | 8/2013 |
| JP | 2006-139963 | 6/2006 |
| JP | 2010-226880 | 10/2010 |
| JP | 2012-210004 | 10/2012 |
| JP | 2004-324613 | 11/2013 |
| WO | WO 2010/000239 | 7/2010 |
| WO | WO 2011/134992 | 11/2011 |
| WO | WO 2013/134863 | 9/2013 |

* cited by examiner

| ROUTE | SEGMENT | TEMPERATURE EVENTS |
|---|---|---|
| A | S1 | |
| A | S2 | |
| A | S3 | THRESHOLD + 10°C; THRESHOLD + 13°C; THRESHOLD + 11°C |
| A | S4 | THRESHOLD + 4°C; THRESHOLD + 1°C; THRESHOLD + 2°C |
| A | S5 | THRESHOLD + 1°C; THRESHOLD + 1°C |
| • | • | • |
| • | • | • |
| • | • | • |
| | | |

FIG. 3A

| ROUTE | DISTANCE FROM START | TEMPERATURE EVENTS |
|---|---|---|
| A | 0 - 0.5 km | |
| A | 0.5 - 1.0 km | |
| A | 1.0 - 1.5 km | THRESHOLD + 10°C; THRESHOLD + 13°C; THRESHOLD + 11°C |
| A | 1.5 - 2.0 km | THRESHOLD + 4°C; THRESHOLD + 1°C; THRESHOLD + 2°C |
| A | 2.0 - 2.5 km | THRESHOLD + 1°C; THRESHOLD + 1°C |
| • | • | • |
| • | • | • |
| • | • | • |
| | | |

| ROW | ROUTE | SEGMENT | FAN SPEED (1-10) | POWER DISTRIBUTION BATTERY | POWER DISTRIBUTION ENGINE | BATTERY TEMP |
|---|---|---|---|---|---|---|
| ROW 400 | A | S1 | 5 | 50% | 50% | NORMAL |
| ROW 402 | A | S2 | 5 | 50% | 50% | NORMAL |
| ROW 404 | A | S3 | 9 | 10% | 90% | OVER THRESHOLD |
| ROW 406 | A | S4 | 8 | 20% | 80% | OVER THRESHOLD |
| ROW 408 | A | S5 | 7 | 30% | 70% | OVER THRESHOLD |

FIG. 4B

| ROW | ROUTE | SEGMENT | FAN SPEED (1-10) | POWER DISTRIBUTION BATTERY | POWER DISTRIBUTION ENGINE | BATTERY TEMP |
|---|---|---|---|---|---|---|
| ROW 410 | A | S1 | 5 | 40% | 60% | NORMAL |
| ROW 412 | A | S2 | 7 | 40% | 60% | COOL |
| ROW 414 | A | S3 | 7 | 30% | 70% | NORMAL |
| ROW 416 | A | S4 | 6 | 90% | 10% | NORMAL |
| ROW 418 | A | S5 | 5 | 50% | 50% | NORMAL |

SYSTEM AND METHOD FOR ADAPTIVE BATTERY TEMPERATURE CONTROL OF A VEHICLE OVER A KNOWN ROUTE

BACKGROUND

1. Field

The present invention relates to a system and a method for adaptively controlling the temperature of a vehicle's battery when the vehicle is travelling along a known route.

2. Description of the Related Art

Most vehicle batteries that are used to power hybrid and electric vehicles are designed to operate at a pre-determined operating temperature range. Typically, a temperature sensor is attached to or integrated with the vehicle batteries to measure the current temperature of the vehicle batteries. The batteries generally discharge electricity when the vehicle is accelerating and the batteries are charged with electric power that is recovered when the vehicle is decelerating, sometimes referred to as regenerative braking. The battery can also be charged with electric power that is recovered during the vehicle deceleration. These discharging and charging cycles are repeated during travel of the vehicle, which can cause a temperature of the battery to increase. When the temperature of the battery is higher, an internal resistance of the battery is lower and the efficiency of charging and discharging is increased.

When the temperature of the vehicle batteries fall outside the normal operating temperature range, the vehicle electronics usually activate a cooling device (e.g., a fan) or a heating device (e.g., a heater) to adjust the temperature of the vehicle batteries so they are operating within the normal operating temperature range.

However, when the battery temperature goes above a certain level, it may cause the battery electrolyte to degrade. As a result, the efficiency of charging and discharging the battery may be reduced. Therefore, it is desirable to keep the battery at an efficient operating temperature that is below the level at which the battery electrolyte degrades. To address this issue, Japanese Pat. Pub. No. 2005-63689A discloses a method of cooling the battery by using a cooling fan driven by an electric motor when the battery temperature exceeds a threshold temperature.

According to the prior art method, by cooling the battery so as to keep the battery temperature below a threshold temperature, the battery charging and discharging efficiency degradation that can occur at the higher battery temperature may be reduced. However, there is still room for improvements. In the prior art method, the threshold temperature to cool the battery is fixed. This can cause the cooling fan to be operated more often than is needed to keep the discharging and charging efficiency close to an optimal efficiency. On the other hand, this can cause the cooling fan to operate less during other conditions, depending on the threshold temperature setting. Also, more energy may be consumed to drive the cooling fan. Or, the battery temperature may increase more than desired, and the efficiency of charging and discharging may be degraded. As a result, the overall efficiency of the electric system may be degraded.

Thus, there is a need for systems and methods, and/or devices, for adaptive battery temperature control of a vehicle over a known route.

SUMMARY

This summary is included to introduce, in an abbreviated form, various topics to be elaborated upon below in the Detailed Description.

Systems or methods for controlling a battery temperature of a vehicle over a known route are described. A method may include providing a route having a starting and ending location, iteratively (or periodically) sensing a battery temperature of the battery when the vehicle is travelling along the route, and dividing the route into a plurality of route segments. The method may also include storing a known route having a plurality of segments where each segment has a corresponding battery temperature of the vehicle when the vehicle previously travelled along the segment. The method may also include providing a cooling device associated with a battery of the vehicle, initiating the cooling device during a previous time segment when the battery temperature for a particular time segment of the known route exceeds a high temperature threshold, and reducing an amount of battery power draw from the battery during the previous time segment.

BRIEF DESCRIPTION OF THE DRAWINGS

The features, obstacles, and advantages of the present invention will become more apparent from the detailed description set forth below when taken in conjunction with the drawings, wherein:

FIG. 3A illustrates exemplary entries within a data storage or database which is contained within a memory according to an embodiment of the present invention;

FIG. 3B illustrates an exemplary set of entries in the data storage or database in an embodiment of the present methods and systems in which the known route is not parsed into segments;

FIG. 4A illustrates an embodiment of results for a vehicle utilizing current cooling technology which does not utilize systems and methods for adaptive battery temperature control of a vehicle over a known route;

FIG. 4B illustrates an embodiment of results that the vehicle, utilizing systems and methods for adaptive battery temperature control of a vehicle over a known route, may achieve.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements. A connection, when mentioned in this document, may refer to any communication connection between modules, and the communications may occur via a wired connection, a wireless connection, or a combination of the two.

Figure 1:
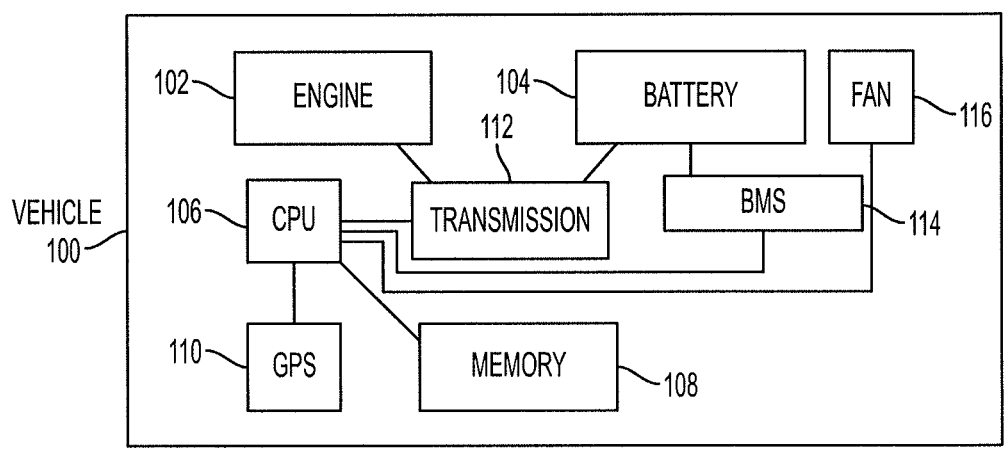
FIG. 1 illustrates components of a vehicle which may be utilized in a system or a method for adaptive battery temperature control of a vehicle over a known route according to an embodiment of the present invention.

Turning to FIG. 1, some components of a vehicle 100 are illustrated. The components of the vehicle 100 are not limited to the components shown and described in FIG. 1. The vehicle 100 may include an engine 102, a battery module (battery) 104 including at least one battery, a central processing unit (CPU) 106 including at least one processor or controller, a memory module (memory) 108 including at least one storage device, a global positioning system (GPS) 110, a transmission module 112 which may contain one or more motor generators for generating torque from the battery 104, a battery management system (BMS) 114, and/or a cooling fan (fan) 116. Most of these devices may be disposed in the vehicle 100, may be located in a location remote from the vehicle 100, or may be a combination of within and remote from the vehicle 100. The lines or connections shown in FIG. 1 can be wired, wireless or a combination thereof. Also, the lines or connections can be one way (one arrow) or two way (two arrows) showing the transfer of information and data in one or both directions.

In one embodiment, the vehicle 100 may be propelled in a direction by power output from the engine 102 and/or the battery 104 to the transmission module 112. The battery 104 may include a motor for generating torque. The amount of power requested from the engine 102 and the battery 104 may be communicated to the engine 102 and the battery 104 by the transmission module 112. The transmission module 112 may receive instructions to alter the distribution of power from the CPU 106. The CPU 106 may communicate with the memory 108, the GPS module 110, the transmission module 112, the BMS 114, and/or the fan 116 by a connection. The CPU 106 may also control clutching and gearing mechanisms associated with the transmission module 112 of the vehicle 100. It may control these clutching and gearing mechanisms by communication to the engine 102 and/or the battery 104 by itself, or it may control these mechanisms by communication to the transmission module 112.

The GPS module 110 may periodically or constantly receive location information from a satellite or satellites, or any other positioning devices. The transmission module 112 may determine, based on input from the CPU 106, how much power output each of the battery 104 and the engine 102 should produce. In some embodiments, the BMS 114 may include equipment to determine a current temperature of the battery 104, and may communicate the temperature to the CPU 106. In other embodiments, the BMS 114 collects measurements from the battery 104, sends the measurements to the CPU 106, and then the CPU 106 calculates a temperature of the battery 104. The fan 116 may be a cooling device, such as a cooling fan driven by an electric motor, and may be instructed by the CPU 106 to operate at various speeds in order to cool the battery 104. The vehicle 100 may also include additional cooling devices for the battery 104, such as a radiator.

The engine 102 and the battery 104 may be connected to the transmission module 112 with a controllable transmission input/output ratio for driving the wheels using torque provided by the engine 102 and/or the battery 104. The engine 102 and/or the battery 104 may be connected to the transmission module 112, for example, via a differential linkage, power splitting mechanisms, and/or various other linkages known in the art.

A route, as used herein, may refer to a distance travelled between an event signaling a beginning of a trip and an event signaling an end of a trip. For example, such an event may be that the ignition is turned on and subsequently turned off. Such an event may be that a door of the vehicle 100 is opened and then shut, and then the door is subsequently opened and shut. The time and/or location of each event may be recorded. "Time," as used herein, may refer to a time of the day, a day of the week, a date, or any other temporal parameter that may be stored regarding a route segment, a route and/or a route set. A "location," as used herein, may refer to latitude or longitude coordinates, a GPS location, a location determined in reference to other known locations, or any other location data regarding the vehicle 100, route segment, route and/or route set.

A route set may refer to a number of different routes linked with one another. The distance values of each route within a route set may be summed in order to obtain a distance of the route set that includes linked routes.

An example will be provided to describe a route set. A driver may leave his house at a specified time in the morning every weekday to go to work. Let's assume that the driver stops at a coffee shop on his way to work every Monday and Wednesday. Let's further assume that on Mondays and Wednesdays, the driver stops at a gym on his way home. The CPU 106 may, over time, recognize that route 1 is from his house to the coffee shop, route 2 is from the coffee shop to his work, route 3 is from his work to the gym, and route 4 is from the gym to his house. Furthermore, using the linking algorithm, the CPU 106 may recognize two route sets, the combination of routes 1 and 2, and the combination of routes 3 and 4. For the sake of simplicity, when a route is mentioned in the present document, it may be referring to a route or a route set.

A system and a method of route prediction will now be described. The memory 108 may include a static data storage or database which may include a segment list and a route list. The segment list may include a plurality of segments. Each of the plurality of segments in the segment list may include a segment identifier, a segment distance, one or more "to" segments, one or more "from" segments, and a plurality of locations. The segment distance may represent the total distance of the segment. The one or more "to" segments may include segment identifiers for segments which have been historically traveled immediately after the segment, and the one or more "from" segments may include identifiers for segments which have historically been traveled immediately before the segment. Each location may include location information, including, but not limited to, latitude, longitude, altitude, speed, course, heading, direction, etc.

The route list may include a plurality of routes. The routes may include a route identifier and an ordered list of segments.

A dynamic data storage or database may also be included within the memory 108. The dynamic data storage or database may include a route history, which may include a plurality of route history entries. Each of the plurality of route history entries may include a route identifier and a route occurrence entry for each time the route was travelled. Each of the plurality of route history entries may also include a start date, a start time, a day of the week, and an ordered list of segments. Each of the segments in the ordered list may include an ordered list of segment identifiers, which correspond to one of the plurality of segments stored within the static data storage or database. Each of the plurality of segments may also include a start time, an end time, a maximum speed, a minimum speed, an average speed, etc.

An exemplary method for parsing segments will now be described. The GPS module 110 may receive a first signal indicative of a first location which may include latitude, longitude, altitude, heading, direction, and/or speed, or any combination, along with any other information. If the signal does not include a heading or a speed, the CPU 106 may calculate a heading and/or speed based on previous location information from the GPS module 110. The vehicle 100 may include sensors such as a gyroscope, an accelerometer, or any other sensor, configured to detect the heading and speed of the vehicle 100.

The vehicle 100 may store locations in the memory 108 at regular or periodic intervals. The vehicle 100 may also store, in the memory 108, locations parsed by a predetermined distance. The locations may all include a timestamp, may be successively numbered, or may be placed in order by any other method available.

In an embodiment, at least two of the locations will include a heading used for detecting when a turn has occurred. The CPU 106 may calculate a difference between the current heading and a previous heading to determine if more than a heading threshold amount has been altered. For example, the heading threshold may be 50 degrees. If the CPU 106 determines, by calculating the difference between the previous heading and the current heading, that the difference is 60 degrees, which is above the heading threshold, then the CPU 106 may determine that a turn has occurred. The heading threshold is not limited to 50 degrees, and in fact may be any degree of change in heading. For example, the current heading may be calculated based on the change in latitude and longitude between the current and any previous location.

This method may be used as well to calculate a previous heading. To make this calculation, the CPU 106 may need to calculate a heading difference between two or more previous locations. The previous locations used to calculate the previous heading may be calculated based on the current speed of the vehicle 100. For example, if the speed is less than 30 mph (miles per hour), then the previous heading may be calculated for the third preceding location (for example, based on the difference in latitude and longitude between the third and fourth preceding locations). However, if the speed is between 30 mph and 60 mph, then the previous heading may be calculated for the sixth preceding location. One of ordinary skill in the art will realize that the speed is not necessary in the equation to determine a previous location, and the correlation between the speed and the number of previous locations may be different than mentioned above.

With the current and previous heading information, the CPU 106 may calculate a difference between the current and previous headings. For example, this may be calculated by subtracting one of the current or previous headings from the other of the current or previous heading.

The CPU 106 may compare the difference in the current and a previous heading to determine if a turn has occurred. A turn has occurred if the difference in headings exceeds the heading threshold.

The CPU 106 may be configured to store, in the memory 108, a segment when a turn has occurred. The segments typically represent a geographic area between detected turns, and may be stored in the segment list. The stored segment may include a starting location and an ending location. The stored segment may also include one or more of the previous locations. The segment may be stored in the static data storage or database in the segment list and/or may be added to the ordered list of segments within the dynamic data storage or database. This is an example of one embodiment for parsing and storing segments, and there are other embodiments which use vehicle speed, road conditions, vehicle stops, etc., as mentioned above, with which to parse routes into segments.

In this embodiment of route prediction, the CPU 106 may predict a route based on the segment list as discussed below. In this embodiment, the CPU 106 may receive, from the GPS module 110, a second signal representing another location. The second signal may include a latitude, longitude, altitude, heading and/or speed. Based on the second signal and a previous signal, the CPU 106 may identify segment candidates from the segment list. One method of identification is to determine the distance between the second location and each location of each segment in the segment list, and identify the one or more segment candidates as those which have at least one location within a threshold distance from the second location. Thus, any segment within the threshold distance may be identified as a segment candidate.

In some embodiments, a list of route candidates may be determined by the CPU 106 and stored in the memory 108. These candidates may be identified by determining which routes of the route list include any of the segment candidates, and then identifying the routes including the segment candidates as route candidates.

In some embodiments, the CPU 106 may calculate or assign a route weight for each of the identified candidate routes. In one example, the route weight for each of the identified candidate routes may be calculated based on information associated with that route in the memory 108. The route weight may be calculated based on the start date, the start time, the day of the week, the time of the day, the ratio of number of times the candidate route was travelled to the total number of times all candidate routes were travelled, etc. The route weight may include multiple components, such as when the route includes a day of the week component, a type of day component, and a time of day component. The day of the week components may be calculated by dividing the total number of times that the candidate route is included in the data storage or database on the current day of the week by the total number of times that candidate is included in the data storage or database. Along the same manner, the type of day component may be calculated by dividing the total number of times the candidate was included on the current type of day by the total number of times the candidate is in the data storage or database. Similarly, a time of day weight may be calculated by dividing the total number of times the candidate is included at the particular time of day by the total number of times the candidate is in the data storage or database. These are only examples and are not intended to limit the route calculation methods.

Once the CPU 106 has calculated the route weights for all candidate routes, the CPU 106 may select the predicted route by selecting the candidate route with the highest route weight. The list of candidate routes and/or candidate segments may be updated continuously or periodically by the CPU 106 based on the current location of the GPS module 110.

In some embodiments, after a predicted route is selected, the GPS module 110 (or any other display equipment within or displaced from the vehicle 100) may display the route graphically. The display equipment may receive input from a user which indicates confirmation of whether the predicted route is correct. However, some embodiments may not request a confirmation of the predicted routes. In some embodiments, if the user indicates that the predicted route is not correct, then the CPU 106 may display one or more predicted routes and request a confirmation.

The memory 108 may contain a data storage or database containing route, segment and temperature information. The driving route may be parsed into one or more segments based on one or more different identifiers. These identifiers include, but are not limited to, a change in the speed of the vehicle 100, a cross street, a stop of the vehicle 100 (e.g., representing anything from stopping to pick up a passenger, a stop at a defined location such as a traffic light, a stop sign, a store, a bank, a restaurant, a place of work, etc.), a turn (e.g., a curve in the road, a turn of about 90 degrees, or a U-turn, etc.), road conditions (e.g., a smooth/rough road transition, a road with many potholes, a road with road construction materials, etc.), a predetermined distance, a predetermined travel time, an incline or decline of a road such as a hill, or any change of a setting, either driver or vehicle 100 induced. However, the presence of the identifiers may not necessarily always result in a new segment being defined.

Furthermore, to facilitate preventative cooling of the battery 104, the route is not required to be divided into segments. For example, a route may be stored simply as a route, without segments, and the temperature information may be recorded based on distance intervals or time intervals from the start of the route. For simplicity, all parsed sections of the route, whether segments or identified by the distance from the beginning of the route, will be described as "segments".

The data storage or database may include a plurality of entries, comprising at least one route identifier, at least one segment identifier for each route, and/or a collection of one or more temperature events for the segment. Each time the vehicle 100 travels on a new route, an entry for the new route and each of the new segments may be recorded in the data storage or database within the memory 108. Additionally, each time the vehicle 100 travels on the known route, the entry for each of the segments of the known route may be updated. For example, the update may add any temperature event information (e.g., data received from the BMS 114 or computed by the CPU 106) to the entry.

When the vehicle 100 traverses the known route, the CPU 106 may receive, from the memory 108, at least one of the information entries for the known route. Based on each of the information entries and current temperature information received from the BMS 114 or its own calculations, the CPU 106 may determine, for each of the segments of the known route, if preventative cooling measures should begin. Preventative cooling measures may include engaging cooling processes, such as instructions from the CPU 106 to the fan 116 to increase speed, instructions from the CPU 106 to the transmission module 112 for the transmission module 112 to decrease the power output from the battery 104 and/or to increase the power output from the engine 102 (in order to reduce power draw from the battery 104, thus preventing further heating of the battery 104), or instructions from the CPU 106 to another device to engage in any other preventative cooling measures.

For example, the CPU 106 may determine, based on information from the at least one entry within the data storage or database in the memory 108, that a segment, which has stored past temperature events, is approaching. A past temperature event may be defined as a period of time during which the vehicle 100 was traversing at least one of the segments, and in which the measured temperature of the battery 104 was above a threshold temperature. The threshold temperature may be any temperature value in which it is desired to keep the battery 104 below that certain temperature in order to avoid, for example, the battery electrolyte from degrading. Instead of or in addition to storing the temperature events, the CPU 106 may instruct the memory 108 to store peak temperatures for each segment over a known route. The peak temperatures may be stored as additional information within an entry, so that the CPU 106 may access temperature information for each segment of the known route, or may be compared to the threshold value for the segment by the CPU 106 to determine if a temperature event has occurred. In another embodiment, the CPU 106 may store in the memory 108 only an average temperature for each segment of the known route.

If the CPU 106 determines that an approaching segment has previously reported temperature events, the CPU 106 may instruct the fan 116, the transmission module 112 and/or any other cooling device, to begin the preventative cooling measures. The preventative cooling measure(s) may be initiated during a prior segment (e.g., one segment earlier, two segments earlier, etc.) depending on the time period of the earlier segments and the amount of time needed to provide the proper cooling. In some embodiments, the vehicle 100 may comprise a radiator system as a cooling device (not shown). The radiator system may pump liquid coolant through ducts which are located near and/or connected to the battery 104, such that the temperature of the battery 104 is reduced by the liquid coolant composition. The preventative cooling measures may be initiated by the CPU 106 at any point before and/or during the segment, which has previously reported temperature events, has been traversed. The CPU 106 may determine when one or more of the preventative cooling measures should begin based on information stored in the data storage or database, such as how long the temperature event lasted, if one or more additional segments in which the vehicle 100 is to traverse on the known route has recorded temperature events, the current temperature values, the values of the temperature events, or any other information associated with the segment. The CPU 106 may also use this information to determine at which levels the preventative cooling measures should operate, for how long each of the preventative cooling measures should operate, and whether the values of the preventative cooling measures should be altered at any point in time in the future, and if so to what values they should be altered. The CPU 106 may continue to make these determinations during the entirety of the known route.

Figure 2:
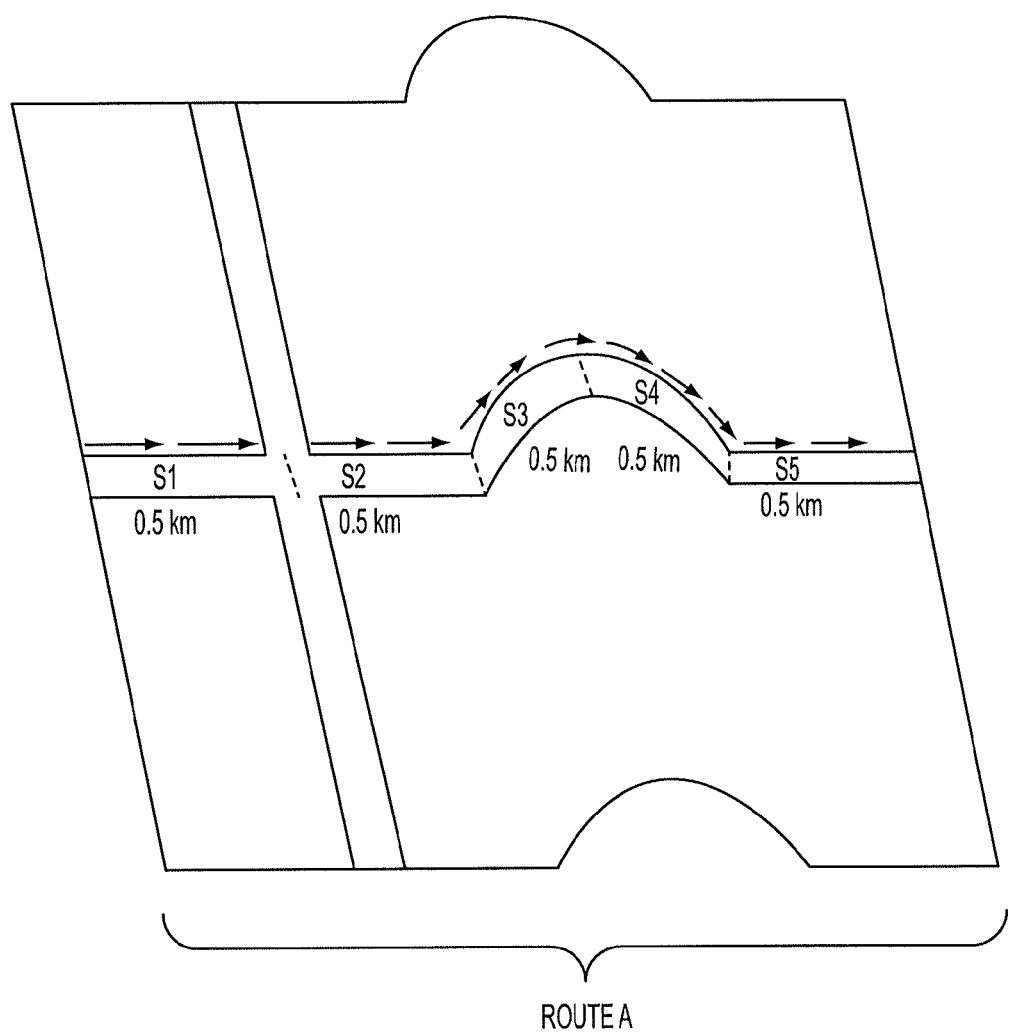
FIG. 2 illustrates an exemplary known route which is parsed into 5 segments according to an embodiment of the present invention.

FIG. 2 illustrates an exemplary known route, Route A. Route A may be parsed into 5 segments: S1, S2, S3, S4 and S5. Each of the segments illustrated in FIG. 2 is 0.5 km (kilometers) in length. The segments may be parsed by any of the identifiers discussed above in reference to FIG. 1. S1, S2 and S5 are relatively flat segments of Route A. S3 contains an increase in elevation, while S4 contains a decrease in elevation.

FIG. 3A shows exemplary entries within the data storage or database, which is contained within the memory 108. The information in the data storage or database may include the known route, the segments and the temperature events. The entries may also contain the peak temperatures for each time each of the segments were traveled. The entries may also contain one threshold temperature value for the route, the segments within the route, or the vehicle without regard to the segment or the route.

The exemplary entries shown in FIG. 3A correspond to the known route shown in FIG. 2. Each entry in this example contains a value corresponding to the route, a value corresponding to the segment, and a value corresponding to each of the temperature events.

The temperature events values may contain any temperatures that were over the threshold, all peak temperatures for each segment, simply the fact that a temperature value exceeded the threshold temperature value, the difference between the threshold and the actual temperature values, and/or any other information associated with the temperature of the battery 104.

In the example illustrated in FIG. 3A, all of the entries are associated with the known route, Route A. There are 5 recorded segments within Route A which correlate to the segments shown in FIG. 2.

As shown in FIG. 3A, segments S1 and S2 are not associated with any temperature events. However, segments S3 and S4 are associated with temperature events. Segment S3 may be associated with temperature events because the increase in altitude over segment S3 requires more power, and more power output results in a rise in temperature. S4 may be associated with temperature events because segment S3 increases in altitude, thus requiring more power to traverse than the previous segments. An increase in power required from the battery 104 may result in a higher temperature for a period of time longer than the period of time that the power required is greater than normal. Thus, segment S4 may also have a recorded temperature event. Segment S4, a downhill segment, may also be associated with temperature events because a downhill segment may cause a high load on the battery 104, as the power of the engine 102 may be very low and most of the requested power may come from the battery 104, as well as momentum. This high load may cause the temperature of the battery 104 to increase. Temperatures may also increase because of charging from regenerative braking, which may occur during a downhill segment. Segment S5 may also have a recorded temperature event as an increase in battery temperature may not immediately be corrected utilizing cooling measures. Thus, segment S5 may have residual high temperature effects from the uphill segment S3 and the downhill segment S4.

FIG. 3B illustrates an exemplary set of entries in the data storage or database in an embodiment in which the known route is not parsed into segments. The route and the temperature events are the same (or similar) as shown in FIG. 3A. However, instead of including a column which stores values for segments, FIG. 3B includes a column which stores values for the distance from the start of the known route to the present location. The route may also be parsed, for example, by a time elapsed from the start of the route. By storing the information in the manner illustrated by FIG. 3B, the method and/or the system may require less data processing from the CPU 106. This is because storing an entry for each iteration of the predetermined distance or time may require less data processing than parsing the route into segments. Additionally, the route may be parsed by periodic periods of time, by the location of the vehicle 100 during temperature events, etc.

FIG. 4A illustrates results from an embodiment for a vehicle utilizing current cooling technology which does not utilize systems and methods for adaptive battery temperature control of a vehicle over a known route. FIG. 4A illustrates, for each of the segments in the known route, Route A, a value representing a fan speed correlating to the segment, a value representing a percentage of power drawn from the battery 104, a value representing a percentage of power drawn from the engine 102, and a value representing the temperature of the battery 104 during the segment.

As illustrated in rows 400 and 402, during segments S1 and S2, the fan speed operated at a level 5 out of 10, and the power distribution was equal between the battery 104 and the engine 102, with 50% of the total power coming from each. Finally, the recorded battery temperatures for both S1 and S2 were recorded as normal.

Row 404, associated with segment S3, illustrates the results of the vehicle 100 increasing in altitude. For the vehicle 100 to increase in altitude, more power may be required. This may result in the battery temperature increasing, as an increase in the power output of the battery 104 may result in an increase in the temperature of the battery 104. As the temperature increases, a temperature event may occur. It is important to note that many more events than an increase in elevation of the vehicle 100 may cause a temperature event. In previous systems without preventative cooling, this meant that cooling measures may begin immediately. Thus, in row 404, the CPU 106 may direct the transmission module 112 to request 90% of the required power from the engine 102 and only 10% of the required power from the battery 104. Likewise, the CPU 106 may instruct the fan 116 to operate at level 9 out of 10. While these cooling measures are occurring, the battery 104 temperature may remain over the threshold temperature value, as the cooling process does not cool the battery 104 to a normal level immediately.

Row 406, associated with segment S4, illustrates the results of the vehicle 100 decreasing in altitude. When the vehicle 100 decreases in altitude, the engine's 102 power output may be very low, thus most of the power may be provided by the battery 104. This may result in the battery temperature increasing, as an increase in the power output of the battery 104 may result in an increase in the temperature of the battery 104. As the temperature increases, a temperature event may occur. Additionally, during downhill segments, regenerative braking may contribute power in order to partially recharge the battery 104. Recharging the battery 104 may also cause the temperature of the battery 104 to increase. Thus, in row 406, the CPU 106 may direct the transmission module 112 to request 80% of the required power from the engine 102 and only 20% of the required power from the battery 104, although normally in a downhill segment, the battery 104 provides most of the power. Likewise, the CPU 106 may instruct the fan 116 to operate at level 8 out of 10. While these cooling measures are occurring, the battery temperature may remain over the threshold temperature value, as the cooling process does not cool the battery 104 to a normal level immediately.

Row 408, associated with segment S5, illustrates the fact that the cooling measures have had a cooling effect on the temperature of the battery 104, but have not yet returned the battery temperature to a normal temperature. The power distribution may return towards normal; the CPU 106 may now request only 70% of the power to come from the engine 102 and 30% of the power to come from the battery 104. Similarly, the CPU 106 may direct the fan 116 to operate at level 7 out of 10. However, while the temperature is returning to normal, the temperature of the battery 104 may still be over the threshold temperature value.

FIG. 4B illustrates results from one embodiment that a vehicle, utilizing systems and methods for adaptive battery temperature control of a vehicle over a known route, may achieve. Segments S1 and S2 do not include any segment of the known route, Route A, which should result in a rise in the temperature of the battery 104. However, utilizing the present systems and methods, the CPU 106 may determine that segments S3 and S4 have recorded temperature events associated with them. After making this determination, the CPU 106 may request that the fan 116 and/or the transmission module 112 engage in the preventative cooling measures. For example, in rows 410 and 412, the CPU 106 has instructed the transmission module 112 to request 40% of the required power from the battery 104 and 60% of the required power from the engine 102. This results in less buildup of heat in the battery 104 prior to reaching the locations correlated with the temperature events. Likewise, the CPU 106 may instruct, in row 412, the fan speed to increase slightly to level 7 out of 10. As a result, the temperature of the battery 104 during segment S2 may be reduced to a cool level in anticipation of the segment associated with temperature events.

In row 414, as the vehicle 100 is climbing in altitude but the preventative cooling measures have been in place for a previous period of time, the CPU 106 may request that the fan speed remain at a level 7 out of 10. The CPU 106 may request that the transmission module 112 request 30% of the required power from the battery 104 and 70% of the required power from the engine 102. The temperature of the battery 104 may increase during segment S3, but as the preventative cooling measures caused the temperature of the battery 104 to be at a cool level during segment S2, the temperature of the battery 104 may only increase to a normal level.

In order to keep the temperature of the battery 104 at or below a normal level, the preventative cooling measures may continue during segment S4. As shown, the CPU 106 may request that the fan 116 operate at a speed 6 out of 10. However, as the battery temperature is at a normal level, the CPU 106 may instruct the transmission 112 to request less power from the engine 102 and more power from the battery 104, which may be preferred during a downhill segment. Thus, the transmission may request 90% of the power from the battery 104 and only 10% of the power from the engine 102.

Row 418 illustrates that during segment S5, no preventative cooling measures are required, and that the temperature of the battery 104 remains at a normal level.

Figure 5:
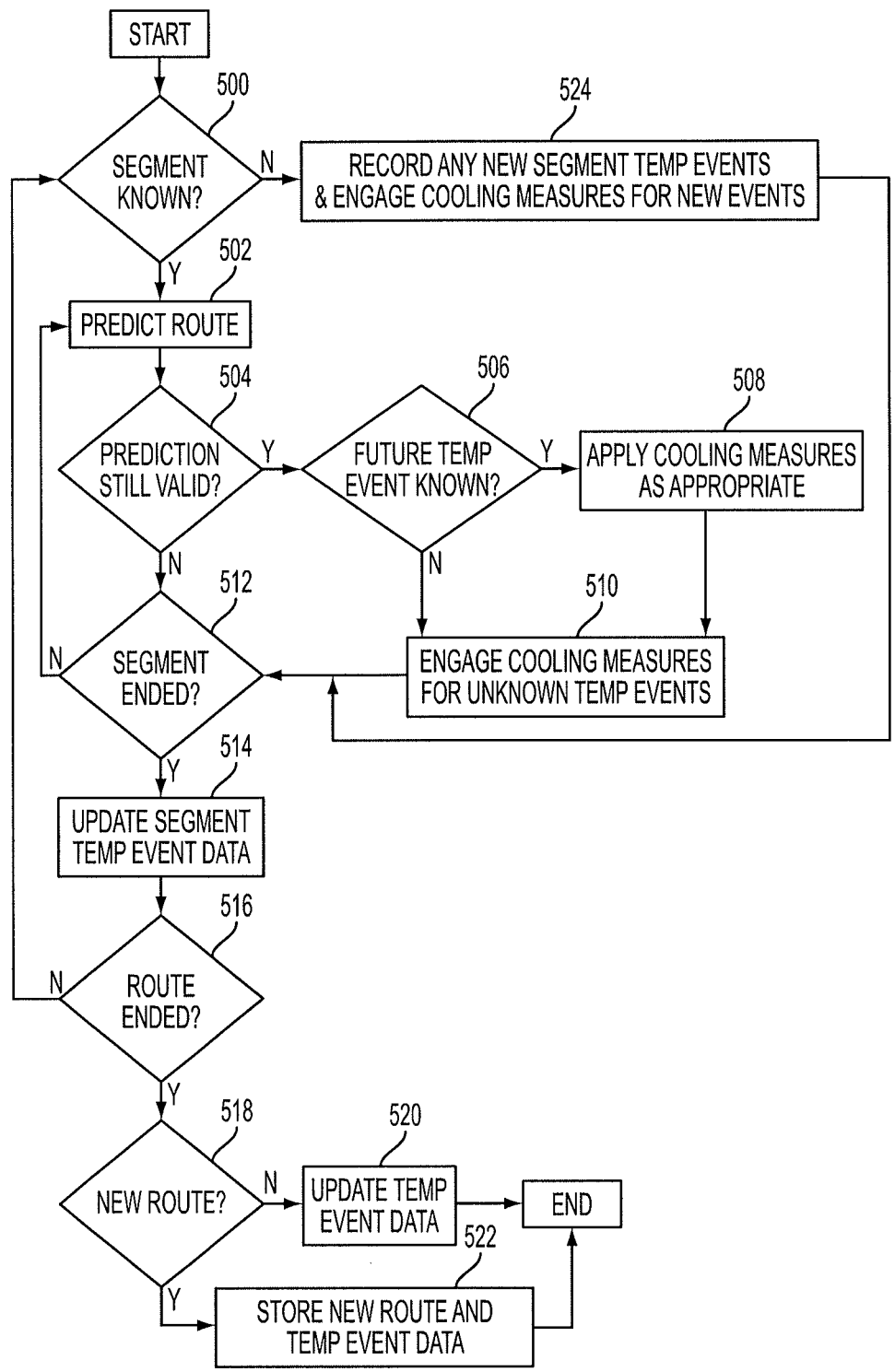
FIG. 5 illustrates a flow chart depicting an embodiment of systems and methods for adaptive battery temperature control of a vehicle over a known route.

FIG. 5 illustrates a flow chart depicting an embodiment of systems and methods for adaptive battery temperature control of a vehicle over a known route. The process may begin in block 500, where the CPU 106 determines whether or not the current segment is known, as discussed above. If the current segment is known, then the process may move to block 502, where the CPU 106 predicts a route, as described above. In block 504, the CPU 106 may determine if the predicted route is still valid, for example, if the next segment is stored in the memory 108 as associated with the predicted route, or if the present heading, a change of direction, user input, etc. correlate to the predicted route information. If the prediction is still valid, in block 506, the CPU 106 may determine if, in the memory 108, a future temperature event is associated with the predicted route. If a future temperature event is known, in block 508, the CPU 106 may apply any cooling measures, such as increasing the fan speed, altering (i.e., increasing or decreasing) the power input from the battery 104 and the engine 102, possibly utilizing the transmission module 112, etc. The CPU 106 may determine the level of the cooling measure(s), which cooling measures to utilize, for how long to apply each cooling measure, etc., based on, for example, the value of the temperature event(s), how far in the future the temperature event(s) are, how long it may take to cool the battery 104 such that a temperature event is prevented, which preventative cooling measures are best at which levels in order to optimize performance, if temperature events exist beyond the upcoming temperature event, how long it will take to cool the battery 104 after the location of the upcoming temperature event, a driving pattern of a particular driver, the optimum temperature of the battery 104 required in order to optimize performance and energy efficiency, etc.

In block 510, the CPU 106 may apply additional cooling measures if an unknown temperature event occurs. In block 512, the CPU 106 determines whether or not the segment has ended. This may be determined by, for example, the known segment having been completed, an identifier which is chosen to parse routes into segments is encountered, etc. If the segment has not ended, the process may return to block 502.

If the segment has been determined to be ended, in block 514, segment information, such as any new "from" segments, "to" segments, temperature events, etc. associated with the segment may be recorded by the CPU 106 in the memory 108. In block 516, the CPU 106 may determine if the route has ended. This may be determined, for example, if the vehicle 100 stops for a period of time, if the vehicle 100 turns off or is turned off, if the CPU 106 determines that all segments of a known route have been completed, etc. If the route has not ended, then the process may return to block 500.

If the route has ended, in block 518, the CPU 106 may determine if the route is a new route or not. This may be determined by checking records in the memory 108 to determine whether or not there is a record of the route. If the route is not a new route, then in block 520, any additional temperature events, associated with any segment of the route, may be stored in the memory 108. If, in block 518, the route is determined to be a new route, then in block 522, the CPU 106 may store, in the memory 108, new route settings and information. For example, this information may include route identifiers and information, segment identifiers and information, and any temperature events for any segment of the route.

If, in block 500, it is determined that the segment is not known, then the CPU 106 may, in block 524, record segment information, such as any "from" segment, "to" segment, location information, etc. in the memory 108. Additionally, any new temperature events may be stored in the memory 108 to be associated with the new segment. Also, any cooling measures for any temperature events may be requested by the CPU 106.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for controlling a temperature of a vehicle battery over a known route, the method comprising:
   storing, in a memory, a route;
   detecting, using a sensor and during a first trip along the route, temperature data corresponding to a battery temperature of the battery;
   determining, by a processor, that a temperature event has occurred at an event location during the first trip along the route based on the temperature data, the temperature event corresponding to the battery temperature rising to or above a threshold temperature;
   storing, in the memory, the temperature event and the event location;
   detecting, by a GPS device and during a second trip along the route, a current location of the vehicle;
   determining, by the processor, that the vehicle is approaching the event location based on the current location of the vehicle; and
   controlling, by the processor, at least one vehicle component to reduce the battery temperature of the battery prior to the vehicle reaching the event location when the processor determines that the vehicle is approaching the event location in order to reduce the likelihood of a second temperature event occurring at the event location.

2. The method of claim 1 wherein the at least one vehicle component includes at least one of a cooling fan or a radiator.

3. The method of claim 1 further comprising reducing, by the processor, a power output of the battery in order to reduce the likelihood of the second temperature event occurring at the event location and wherein the at least one component includes the battery.

4. The method of claim 1 further comprising determining, by the processor, when to control the at least one vehicle component to reduce the battery temperature based on at least one of a current battery temperature or a distance between the current location of the vehicle and the event location.

5. The method of claim 1 further comprising predicting, by the processor, that the vehicle is traveling along the route during the second trip along the route.

6. The method of claim 5 wherein predicting that the vehicle is traveling along the route includes:
   selecting, using the processor, at least two candidate routes;
   assigning, using the processor, a route weight for each of the at least two candidate routes; and
   predicting, using the processor, that a candidate route from the at least two candidate routes is the route based on the candidate route having a higher route weight than each of the other candidate routes.

7. The method of claim 1 wherein the temperature event is caused by at least one of a power request initiated by a driver, a power request initiated by the processor or a battery charge event.

8. The method of claim 1 wherein the route includes at least two different routes linked together.

9. The method of claim 1 further comprising determining, by the processor, an amount to control the vehicle component to reduce the battery temperature based on at least one of a current battery temperature or a distance between the current location of the vehicle and the event location.

10. An apparatus for controlling a temperature of a vehicle battery over a known route, the apparatus comprising:
    a battery having a battery temperature and being configured to store electrical energy;
    a memory configured to store a route, at least one temperature event corresponding to the battery temperature rising to or above a threshold temperature during a first trip along the route, and an event location of the temperature event;
    at least one controllable device configured to reduce the temperature of the battery;
    a GPS device configured to detect a current location of the vehicle; and
    a processor configured to determine that the vehicle is approaching the event location based on the current location of the vehicle and to control the at least one controllable device to reduce the battery temperature of the battery prior to the vehicle reaching the event location when or after determining that the vehicle is approaching the event location to reduce the likelihood of a second temperature event occurring at the event location.

11. The apparatus of claim 10 wherein the at least one controllable device includes a fan configured to blow air in a vicinity of the battery.

12. The apparatus of claim 10 wherein the at least one controllable device includes a radiator system configured to pump a liquid cooling composition in an area proximate to the battery.

13. The apparatus of claim 10 wherein the processor is further configured to reduce a power output of the battery to reduce the likelihood of the second temperature event occurring at the event location.

14. The apparatus of claim 10 wherein the processor is further configured to determine when to control the at least one vehicle component to reduce the battery temperature based on at least one of a current battery temperature or a distance between the current location of the vehicle and the event location.

15. The apparatus of claim 10 wherein the processor is further configured to:
    select at least two candidate routes;
    assign a route weight for each of the at least two candidate routes; and
    predict that a candidate route from the at least two candidate routes is a current route of the vehicle based on the candidate route having a higher route weight than each of the other candidate routes.

16. A method for controlling a temperature of a battery of a vehicle comprising:
    storing, in a memory, a plurality of known routes;
    detecting, using a GPS device, a first location of the vehicle;
    predicting, by a processor, that a current route of the vehicle is one of the known routes based on at least the first location of the vehicle;

storing, in the memory, a temperature event that was detected at an event location during a previous trip of the vehicle along the current route;

detecting, using a GPS device, a current location of the vehicle;

determining, by the processor, that the vehicle is approaching the event location based on the current location of the vehicle; and controlling, by the processor, at least one vehicle component to reduce the battery temperature of the battery prior to the vehicle reaching the event location when or after the processor determines that the vehicle is approaching the event location in order to reduce the likelihood of a second temperature event occurring at the event location.

17. The method of claim 16 wherein the at least one vehicle component includes at least one of a cooling fan or a radiator.

18. The method of claim 16 further comprising reducing, by the processor, a power output of the battery in order to reduce the likelihood of a second temperature event occurring at the event location and wherein the at least one component includes the battery.

19. The method of claim 16 further comprising determining, by the processor, when to control the at least one vehicle component to reduce the battery temperature based on at least one of a current battery temperature or a distance between the vehicle and the event location.

20. The method of claim 16 wherein the temperature event is caused by at least one of a power request initiated by a driver, a power request initiated by the processor or a battery charge event.

* * * * *